US011663505B2

(12) United States Patent
Hwang et al.

(10) Patent No.: US 11,663,505 B2
(45) Date of Patent: May 30, 2023

(54) ESTIMATING PERFORMANCE AND REQUIRED RESOURCES FROM SHIFT-LEFT ANALYSIS

(71) Applicant: INTERNATIONAL BUSINESS MACHINES CORPORATION, Armonk, NY (US)

(72) Inventors: Jinho Hwang, Ossining, NY (US); Li Zhang, Yorktown Heights, NY (US); Maja Vukovic, New York, NY (US); Alaa S. Youssef, Valhalla, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 476 days.

(21) Appl. No.: 16/814,963

(22) Filed: Mar. 10, 2020

(65) Prior Publication Data

US 2021/0287108 A1   Sep. 16, 2021

(51) Int. Cl.
*G06F 11/00* (2006.01)
*G06N 5/04* (2023.01)
*G06F 11/36* (2006.01)
*G06F 8/77* (2018.01)
*G06N 20/00* (2019.01)

(52) U.S. Cl.
CPC ............. *G06N 5/04* (2013.01); *G06F 8/77* (2013.01); *G06F 11/3616* (2013.01); *G06N 20/00* (2019.01)

(58) Field of Classification Search
CPC .. G06F 11/3433; G06F 9/505; G06F 11/3485; G06F 11/3006; G06F 11/3034; G06F 11/3616
See application file for complete search history.

(56) References Cited

U.S. PATENT DOCUMENTS

| 8,478,879 | B2 * | 7/2013 | Brown ................. G06Q 10/063 709/224 |
| 9,471,375 | B2 | 10/2016 | Dube et al. |
| 9,565,129 | B2 | 2/2017 | Bai et al. |
| 9,715,663 | B2 * | 7/2017 | Baldini Soares ...... G06N 20/00 |
| 10,142,179 | B2 | 11/2018 | Ashby, Jr. et al. |
| 11,151,025 | B1 * | 10/2021 | Gupta ................. G06F 11/3688 |
| 2008/0307387 | A1 | 12/2008 | Yoon et al. |

(Continued)

FOREIGN PATENT DOCUMENTS

| CN | 105183650 A | 3/2018 |
| CN | 109284871 A | 1/2019 |
| CN | 109412829 A | 3/2019 |

OTHER PUBLICATIONS

Mell, P. et al., "Recommendations of the National Institute of Standards and Technology"; NIST Special Publication 800-145 (2011); 7 pgs.

*Primary Examiner* — Amine Riad
(74) *Attorney, Agent, or Firm* — Intelletek Law Group, PLLC; Gabriel Daniel, Esq.

(57) ABSTRACT

A shift-left analysis system receives information regarding an application implemented by one or more microservices. The system determines a microservice performance metric based on a performance prediction model for each microservice of the application. The system outputs an application performance metric for the application based on the microservice performance metrics determined for the one or more microservices of application.

20 Claims, 9 Drawing Sheets

(56) References Cited

U.S. PATENT DOCUMENTS

| | | |
|---|---|---|
| 2013/0227524 A1 | 8/2013 | Im et al. |
| 2015/0295794 A1* | 10/2015 | Maher .................. G06F 11/3428 |
| | | 709/224 |
| 2015/0310335 A1 | 10/2015 | Fan et al. |
| 2016/0306613 A1 | 10/2016 | Busi et al. |
| 2019/0318222 A1 | 10/2019 | Mallela |

* cited by examiner

ESTIMATING PERFORMANCE AND REQUIRED RESOURCES FROM SHIFT-LEFT ANALYSIS

BACKGROUND

Technical Field

The present disclosure generally relates to tools for software development, and more particularly, for tools for software development in applications that use microservices architecture.

Description of the Related Arts

Shift-left testing means testing earlier in the software development process. It is a practice intended to find and prevent defects early in the software delivery process. The idea is to improve quality by moving tasks to the left (along the time axis), i.e., as early in the development process as possible. Microservices are a software development technique, which is a variant of the service-oriented architecture structural style that arranges an application as a collection of loosely coupled services that are independently deployable. In a microservices architecture, services are fine-grained and the protocols are lightweight.

SUMMARY

Some embodiments of the disclosure provide a shift-left analysis system. The system receives information regarding an application implemented by one or more microservices. The system determines a microservice performance metric based on a performance prediction model for the microservice for each microservice of the application. The system outputs an application performance metric for the application based on the microservice performance metrics determined for the one or more microservices of application.

In some embodiments, the performance prediction model of a microservice is trained by multiple training sets that correspond to different call paths through the microservice and runtime measurements. The performance prediction model of a microservice is trained to produce a set of corresponding performance metrics when presented with a call path through the microservice. The call path may correspond to an invocation of an application program interface of the microservice. In some embodiments, the call path is represented by a graph embedding vector having dimensions that correspond to a structure of the microservice or the application.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Figure 1:
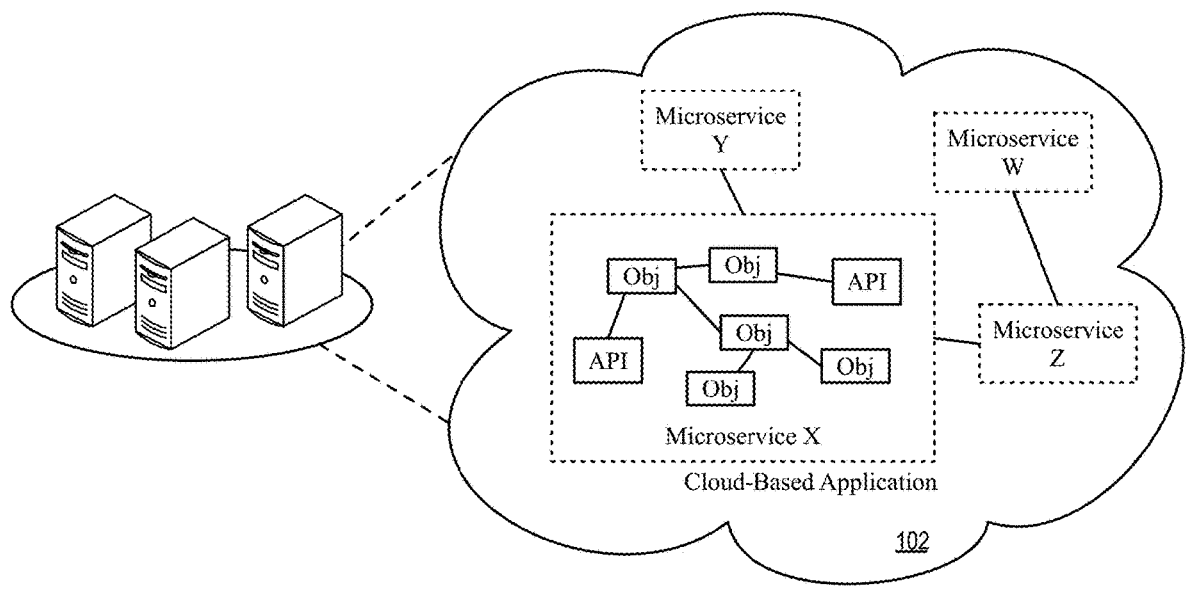
FIG. 1 illustrates a shift-left analysis system capable of estimating the performance of a microservice-based application.
Figure 1:
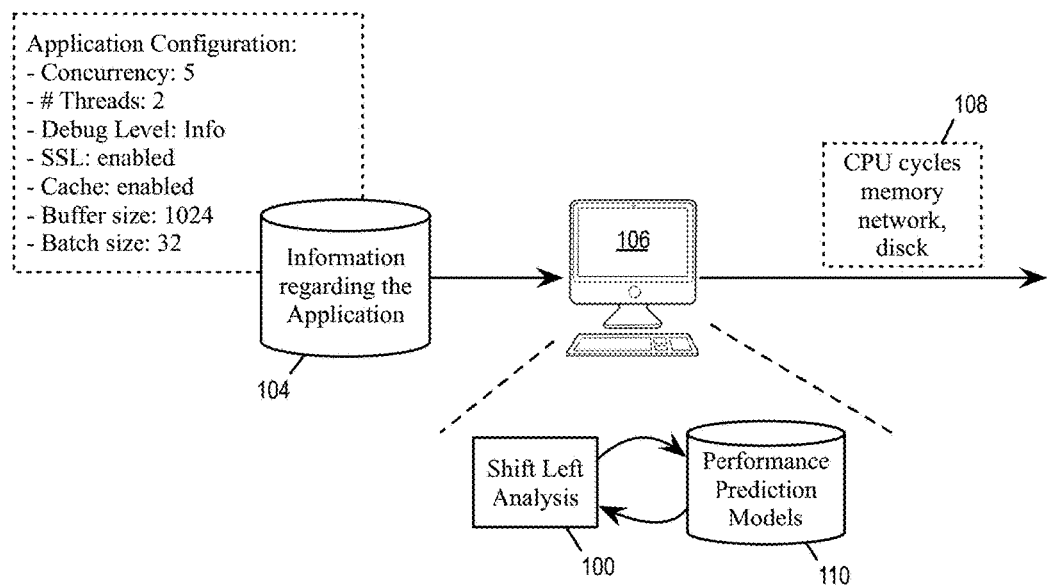

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The use of microservices is increasingly popular since microservices are particularly well suited for a cloud native environment. However, when a software development effort upgrades a legacy application to a microservice-based architecture, conventional resource provisioning strategies fail, since microservice-based architectures have very different performance profiles. Furthermore, different microservices may have different resources and expected performance metrics (e.g. latency and throughput). Thus, when developing a new cloud-native application, it is often difficult to find the right resource provisioning strategy.

Some embodiments of the disclosure provide a shift-left analysis system that is capable of estimating the performance and resource requirement of an application that uses microservices in a cloud environment. The estimated resource and performance requirement can be used by the user of the system to decide on the configuration or architecture of the application before deployment. For example, the user may use the estimated requirements to determine the scalability policies (e.g., scale in/out threshold, etc.) of the microservices implementing the application, and/or to decide which cloud services to use (e.g. spot, serverless, virtual machine, physical machine, etc.).

The system extracts operational characteristics from logs, communication and documentation and allows validation by human/delivery experts. The system may identify the target environment and performance prediction model, specifically by determining operational characteristics based on connectivity or dependencies between proposed microservices. In some embodiments, the shift-left analysis system collects, discovers, or receives information of the microservice-based application such as the source code, configurations, design documents, existing runtime measurements, etc. Based on the collected information, the system may generate architectural dependencies, source code call graphs, program dependency graph, control flow graph, abstract syntax tree, and/or current deployment models in graph formats. The system may analyze application entries with programming interfaces such as REST APIs. The system may also analyze application dependencies that call other services such as database, memory cache, and so on. The system then extrapolates a performance number (e.g., worst case) for each microservice and generates an overall performance estimate for the application based on the extrapolated performance numbers of the microservices. In some embodiments, one or more performance prediction models based on machine learning is used to generate the extrapolated microservice performance numbers. The system may use the extrapolated performance numbers to infer the required resources for various cloud environments or to plan the usage of cloud resources for the deployment of the application. In some embodiment, the system allows a feedback loop with an active learning or a semi-supervised passive learning methodology, which enables capture of human knowledge. The system may capture real-time data as well as selectively prompting for developers/operators to provide feedback that can be consumed via the learning engine.

For some embodiments, FIG. 1 illustrates a shift-left analysis system 100 capable of estimating the performance of a microservice-based application 102. The user may use the system 100 to perform shift-left analysis of the application 102, specifically, by using the system to generate a performance estimate 108 for the application 102 before it is deployed. The system 100 may generates the estimate 108 based on information 104 regarding the application 102. The application 102 has a microservice-based architecture implemented as a suite of independently deployable services. In the example, the application 102 is deployed in a cloud environment and includes at least microservices W, X, Y, and Z. Each microservice may be operating across multiple computing devices or servers, and may be individually scalable to consume more or less resources based on static configurations or dynamic conditions.

As illustrated, a computing device 106 implements the shift-left analysis system 100. The shift-left analysis system 100 may receive the application information 104 from a software development tool that is used to develop the application 102. Such a software development tool may operate in the computing device 106 or another computing device.

As the application 102 is being modified and developed, information 104 that correspond to different versions of the application 102 can be fed to the shift-left analysis system 100 to obtain performance estimates for those different versions. In some embodiments, the application information 104 for a particular version of the application may include configuration, source code, and design documentation of that particular version. The shift-left analysis system 100 in turn may use the application information 104 to generate architectural dependencies, source code call graphs, program dependency graph, control flow graph, abstract syntax tree, and/or current deployment models in graph formats. For example, the system 100 may analyze the source code to identify application entries (e.g., REST APIs). The system 100 may also analyze the design documentation to identify application dependencies that call other services such as database, memory cache, and so on.

In order to generate the performance estimate 108, the shift-left analysis system 100 uses one or more performance prediction models 110 that models the relevant behaviors of the application 102, including the behaviors of the microservices (W, X, Y, and Z). In some embodiments, these performance prediction models 110 are generated by machine learning based on the application information 104.

Figure 2B:
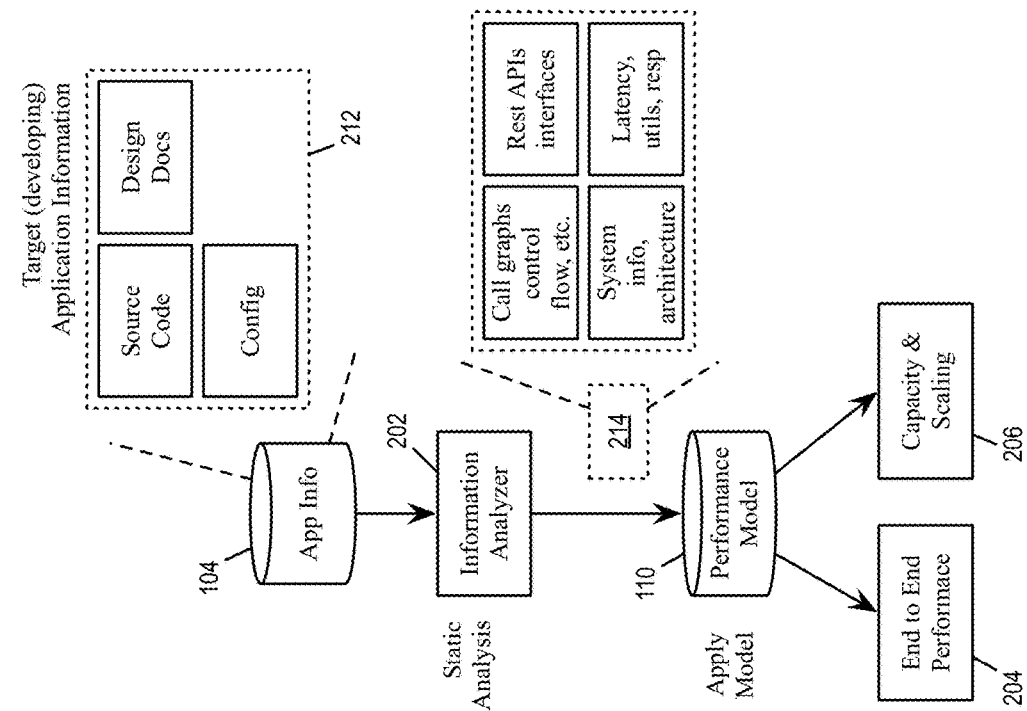
FIGS. 2a-b conceptually illustrates the generation and the use of the performance prediction models by the shift-left analysis system, consistent with an exemplary embodiment.
Figure 2A:
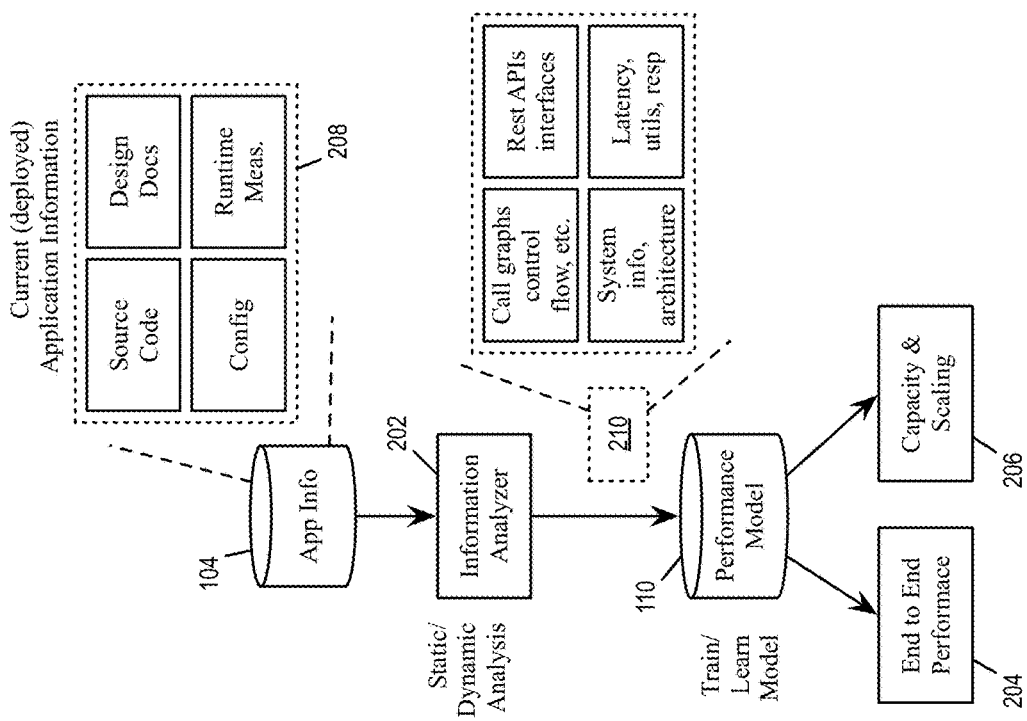

FIGS. 2a-b conceptually illustrates the generation and the use of the performance prediction models 110 by the shift-left analysis system 100. The figures illustrate data flow through the components of the system shift-left analysis system 100. As illustrated, the shift-left analysis system 100 includes an information analyzer module 202, an end-to-end performance module 204, and a capacity and scaling module 206. The information analysis module 202 retrieves application information 104 and generates input vector for the performance prediction models 110. The output of the performance prediction models 110 are used by the end-to-end performance module 204 and/or the capacity and scaling module 206.

In some embodiments, the performance prediction models 110, the information analyzer module 202, the end-to-end performance module 204, and the capacity and scaling module 206 are modules of software instructions being executed by one or more processing units (e.g., a processor) of the computing device 106. In some embodiments, the modules 110 and 202-206 are modules of hardware circuits implemented by one or more integrated circuits (ICs) of an electronic apparatus. Though the modules 110 and 202-206 are illustrated as being separate modules, some of the modules can be combined into a single module. For example, the functionalities of the end-to-end performance module 204 and/or the capacity and scaling module 206 can be merged to form post processing module.

FIG. 2a illustrates the training of the performance prediction models 110 by using information 208 of an already deployed (or current or existing) version of the application 102. The information 208 includes source code, design documents, configurations, as well as actual runtime measurements of the deployed version of the application. The shift-left analysis system 100 performs static and dynamic analysis at the information analyzer 202 on the information 208 to identify or generate application analysis and statistics 210, which may include call graphs, control flows, REST API interfaces, system information, architecture, latency, utilization, response time, etc. The application analysis and statistics 210 are used to train the performance prediction models 110.

FIG. 2b illustrates using the performance prediction models 110 to predict the performance of a developing (or target) version of the application 102, which is yet to be deployed. The shift-left analysis system 100 collects information 212 regarding the developing version of the application. The collected information 212 may include source code, design documents, and configuration of the developing version of the application. The information 212 may not include runtime measurements, since it is the information collected about a version of the application that is not yet deployed. The shift-left analysis system 100 performs static analysis (at the information analyzer 202) on the application information 212 to identify or generate application analysis and statistics 214, which may include call graphs, control flows, REST API interfaces, system information, architecture, latency, utilization, response time, etc. Based on the application analysis and statistics 214, the performance prediction models 110 is used to estimate the performance of each microservices.

The end-to-end performance module 204 uses the estimated performance of the microservices to generate an overall performance estimate of the application 102. The end-to-end performance module 204 may also calculate a composite performance metric for multiple microservices of the application. The end-to-end performance module 204 may compute the overall performance estimate based on how frequent are the microservices invoked such that the performance estimates of more frequently invoked microservices are weighted more heavily than performance estimates of less frequently invoked microservices. The end-to-end performance module 204 may also use the structure or the dependencies of the application to determine how to factor the performance estimates of the different microservices into the overall performance estimate of the application.

The capacity and scaling module 206 uses the estimated performance of the microservices to determine the capacity and the scaling of the microservices by e.g., testing different configurations and trying different trade-offs.

In some embodiments, the shift-left analysis system 100 generates a vector as input to the performance prediction models 110 for training and/or for obtaining performance estimate. The elements or dimensions of the vector may correspond to structures of the application 102, including its data structures and logical dependencies of the microservices. In some embodiments, the input vector is generated based on the structures of the application and/or of the microservices that are relevant in determining the performance of the application. For example, an input may be a vector having values to indicate an invocation of an API and a call path through a microservice, and a corresponding output from the performance prediction models 110 is a performance estimate that corresponds to the call path. In some embodiments, the structures of the application are mapped as a graph, where at least some of the nodes of the graph correspond to classes in the source code of the application. A call path of a microservice may correspond to a subgraph of the graph, and a graph convolution operation may be performed to take advantage of the average value of the node features of the node along with its neighbors. The neighbors of a node maybe unordered and variable in size. In some embodiments, graph embedding is performed to convert the graph into an input vector for the performance prediction models 110.

The performance prediction models 110 can be trained to output a specific set of performance measures, such as number of CPU cycles, amount of memory used, amount network data traffic generated, amount of mass storage space used, etc. The performance prediction models 110 may output these performance measures as an output vector. In some embodiments, training sets that includes pairs of input and output vector are derived from the application information (e.g., information 104, 208, or 212) for training the performance prediction models 110.

Figure 3:
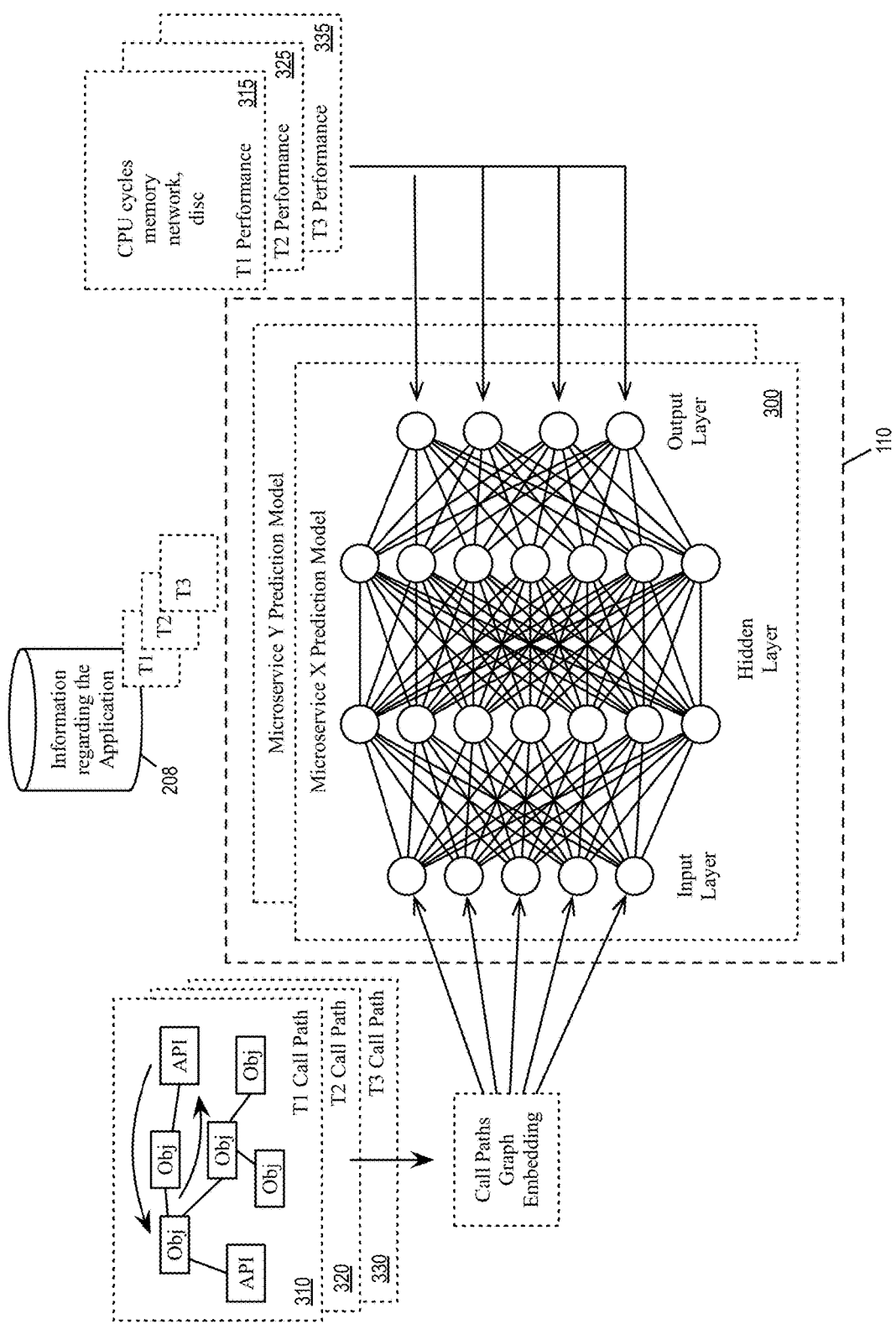
FIG. 3 conceptually illustrates the training of the performance prediction model of the shift-left analysis system, consistent with an exemplary embodiment.

FIG. 3 conceptually illustrates the training of the performance prediction models 110 of the shift-left analysis system 100. As illustrated, the performance prediction models 110 includes performance prediction models for different microservices (e.g., "microservice X" and "microservice Y"). The performance prediction model for "microservice X" may be a learning model based on a neural network 300.

In the example, the system 100 uses the application information 208 to generate training sets T1, T2, and T3. Training set T1 includes input vector 310 and output vector 315. Training set T2 includes input vector 320 and output vector 325. Training set T3 includes input vector 330 and output vector 335. Each of training sets T1, T2, and T3 corresponds to different call paths of a same microservice ("microservice X") in the application. The input vector 310 of T1 is a vector that represents a first call path of the microservice X. The output vector 315 of T1 is a vector of performance measures that are based on actual runtime measurements when the same call path is used. T2 and T3 correspond to different call paths and their corresponding performance measurements. In some embodiments, graphic representations of the call paths are converted to vector representation by graph embedding.

The values at different dimensions of the input vector of T1 are applied to the input layer of the neural network 300, while the values at different dimensions of the output vector of T1 are expected at the output layer of the neural network 300 during training. Likewise, T2 and T3 input and output vectors are also used to train the neural network. The nodes or neurons of the input layer may correspond to different features or structures or components of the application or microservice X, and the nodes or neurons of the output layer may correspond to different performance measurements. The hidden layers of the neural network 300 may correspond to various weighted mappings between features of the microservice X and performance measures. Once trained, the performance prediction models 110 may be used to generate predicted performance measures for a developing (or target) version of the application 102 (e.g., based on information 212).

Figure 4:
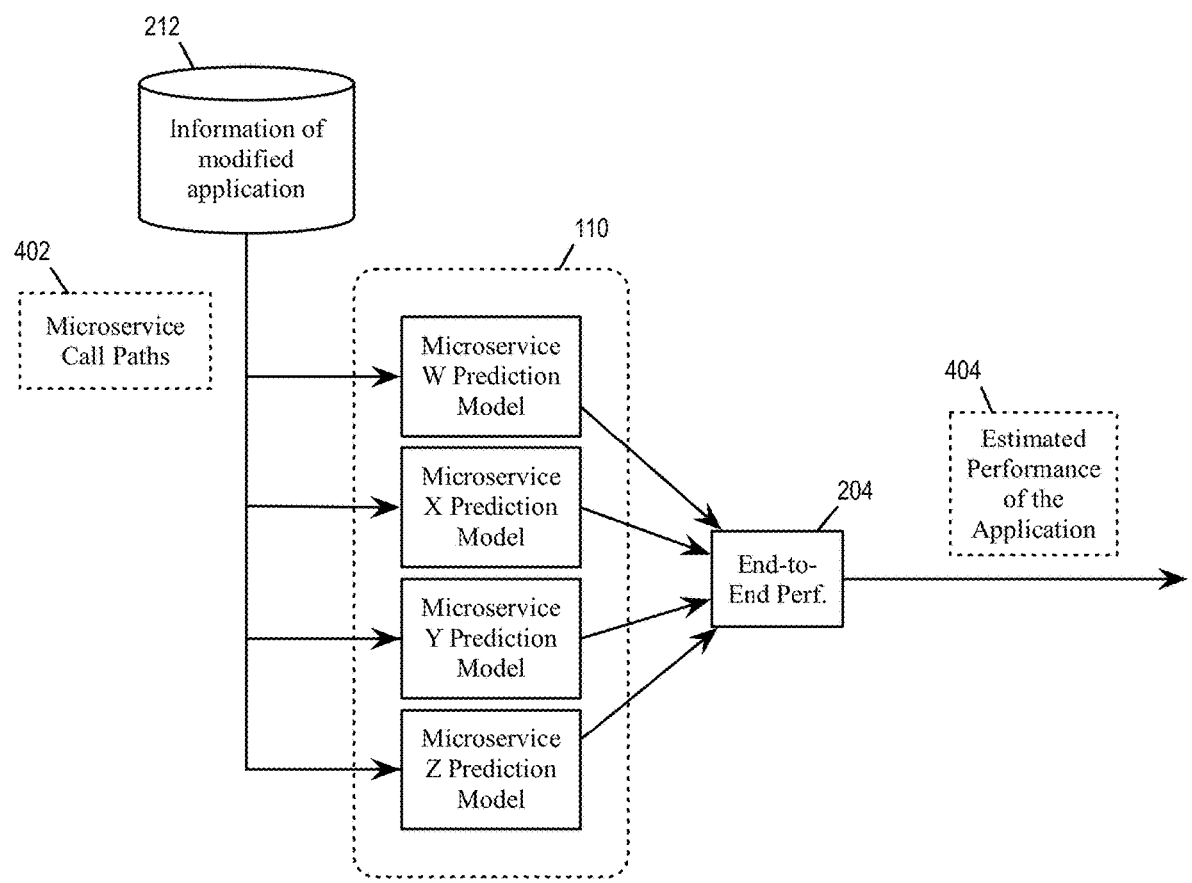
FIG. 4 conceptually illustrates the generation of predicted performance measures by the shift-left analysis system, consistent with an exemplary embodiment.

FIG. 4 conceptually illustrates the generation of predicted performance measures by the shift-left analysis system. As illustrated, input vectors 402 are derived from the information 212 of a version of the application that is yet to be deployed. The input vector 402 is applied to the performance prediction models 110 to obtain predicted performance measures. As illustrated, the performance prediction models 110 includes models for microservices W, X, Y, and Z. These input vector 402 may correspond to call paths through the various microservices. The models for the various microservices are used to extrapolate performance measures for these individual call paths. The extrapolated performance measures can then be used by the shift-left analysis system 100 (at end-to-end performance module 204) to generate an overall estimate 404 of the performance of the application.

It is possible that the data sources of the application information may not perfectly represent the real performance of the application. In some of embodiments, the shift-left analysis system 100 allows user feedback to adjust the application information or the performance prediction models 110 in order to improve the precision of the estimated performance 404. In some embodiments, information from human experts are used to adjust the performance prediction models 110 to correct inaccuracies. In some embodiments, active learning or semi-supervised learning techniques based on user input are used to train or adjust the performance prediction models 110.

Figure 5:
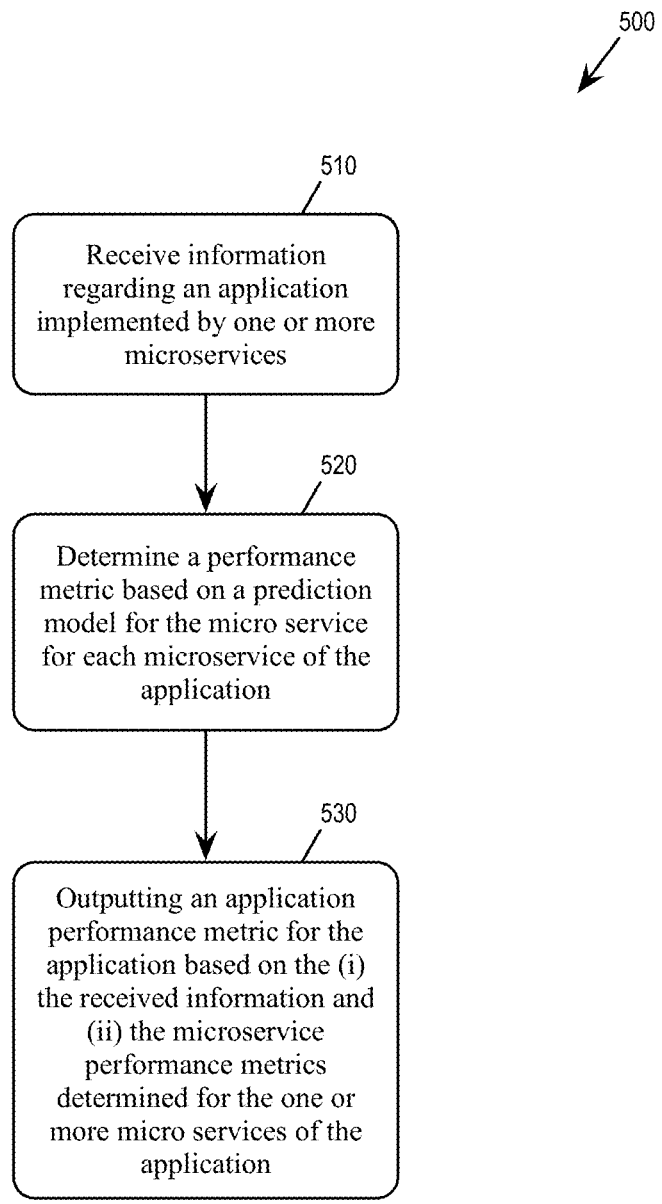
FIG. 5 conceptually illustrates a process for a shift-left analysis that predicts the performance of microservice-based application, consistent with an exemplary embodiment.

FIG. 5 conceptually illustrates a process 500 for a shift-left analysis that predicts the performance of microservice-based application, consistent with an exemplary embodiment. In some embodiments, one or more processing units (e.g., processor) of a computing device implementing the shift-left analysis system 100 (e.g., the computing device 106) perform the process 500 by executing instructions stored in a computer readable medium. In some embodiments, the computing device 106 performs the process 500 when using the performance prediction models 110 to produce the overall estimated performance 404.

The system receives (at block 510) information regarding an application implemented by one or more microservices (e.g., information 104 or 202). Each microservice is a program configured to operate across multiple computing devices and are individually scalable to consume resources based on static configurations or dynamic conditions. The received information regarding the application may include a source code, configurations, design documents, or existing runtime measurements of the application.

The system determines (at block 520) or extrapolate a microservice performance metric based on a performance prediction model for each microservice of the application. In some embodiments, the system may also calculate a composite performance metric for multiple microservices of the application. In some embodiments, the performance prediction model of the particular microservice is trained using machine learning techniques by multiple training sets that correspond to different call paths through the particular microservice and runtime measurements. The performance prediction model of a microservice is trained to produce a set of corresponding performance metrics when presented with a call path through the microservice. The call path may correspond to an invocation of an application program interface of the microservice. In some embodiments, the call path is represented by a graph embedding vector having dimensions that correspond to a structure of the microservice or the application.

The system outputs (at block 530) or provides an application performance metric or overall performance estimate for the application based on the microservice performance metrics determined for the one or more microservices. The application performance metric and other result of the performance prediction model can be used to plan the usage of cloud resources for the deployment of the application.

Figure 6:
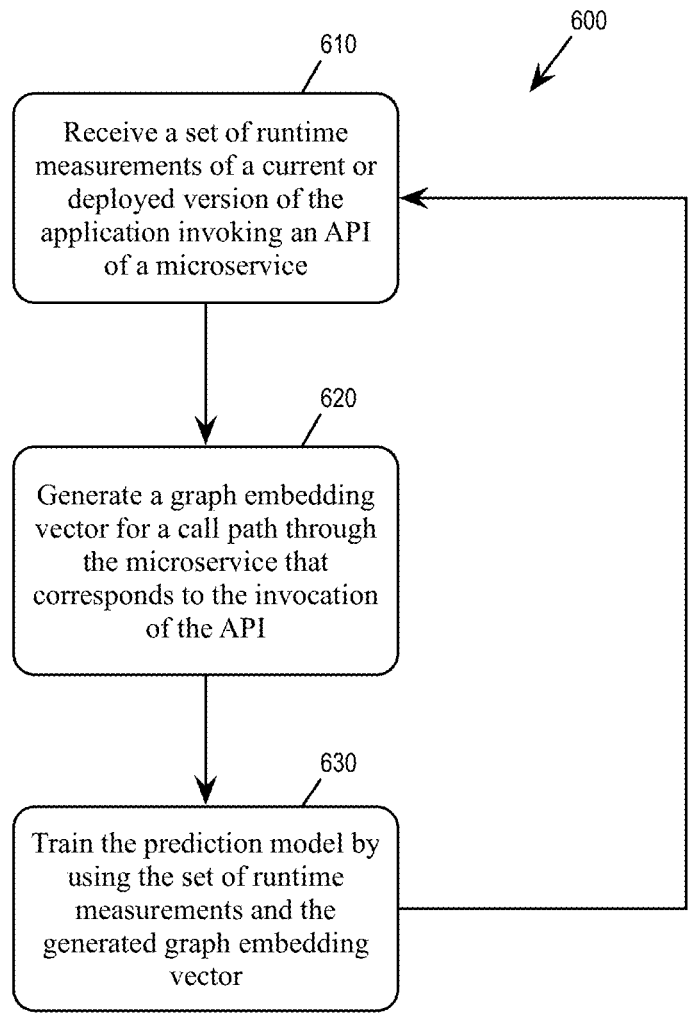
FIG. 6 conceptually illustrates a process for training the performance prediction model used by the shift-left analysis system, consistent with an exemplary embodiment.

FIG. 6 conceptually illustrates a process 600 for training the performance prediction model used by the shift-left analysis system 100, consistent with an exemplary embodiment. In some embodiments, one or more processing units (e.g., processor) of a computing device implementing the shift-left analysis system 100 (e.g., the computing device 106) perform the process 600 by executing instructions stored in a computer readable medium. In some embodiments, the computing device 106 performs the process 600 when training the performance prediction models 110 for predicting the performance of an application.

The system receives (at block 610) a set of runtime measurements of a current or deployed version of the application (e.g., application information 208) when the application invokes an API of a microservice. The set of runtime measurement may include performance measures such as number of CPU cycles, amount of memory used, amount network data traffic generated, amount of mass storage space used, etc. that are captured when the application invokes the API. The process then proceeds to block 620.

The system generates (at block 620) a graph embedding vector for a call path through the microservice that corresponds to the invocation of the API. The structure (e.g., the dimensions) of the vector may correspond to structures of the application, including its data structures and logical dependencies of the microservices in the application. The input vector is generated based on the structures of the application and/or of the microservices that are relevant in determining the performance of the application. The process then proceeds to block 630.

The system trains (at block 630) the performance prediction model by using the set of runtime measurements and the generated graph embedding vector as a training set. The process then returns to block 610 to receive further runtime measurements and call paths to further train the performance prediction model.

By using a machine learning model that is trained to produce a set of performance estimates when presented with a vector representing a structure or a call path of a microservice-based application, the shift-left analysis system 100 enables software developers to quickly predict the performance of a microservice-based application that is being developed and to determine appropriate resource requirement for the microservices, without actual deployment. The computing efficiencies of the developed applications are therefore improved.

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIGS. 5 and 6) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
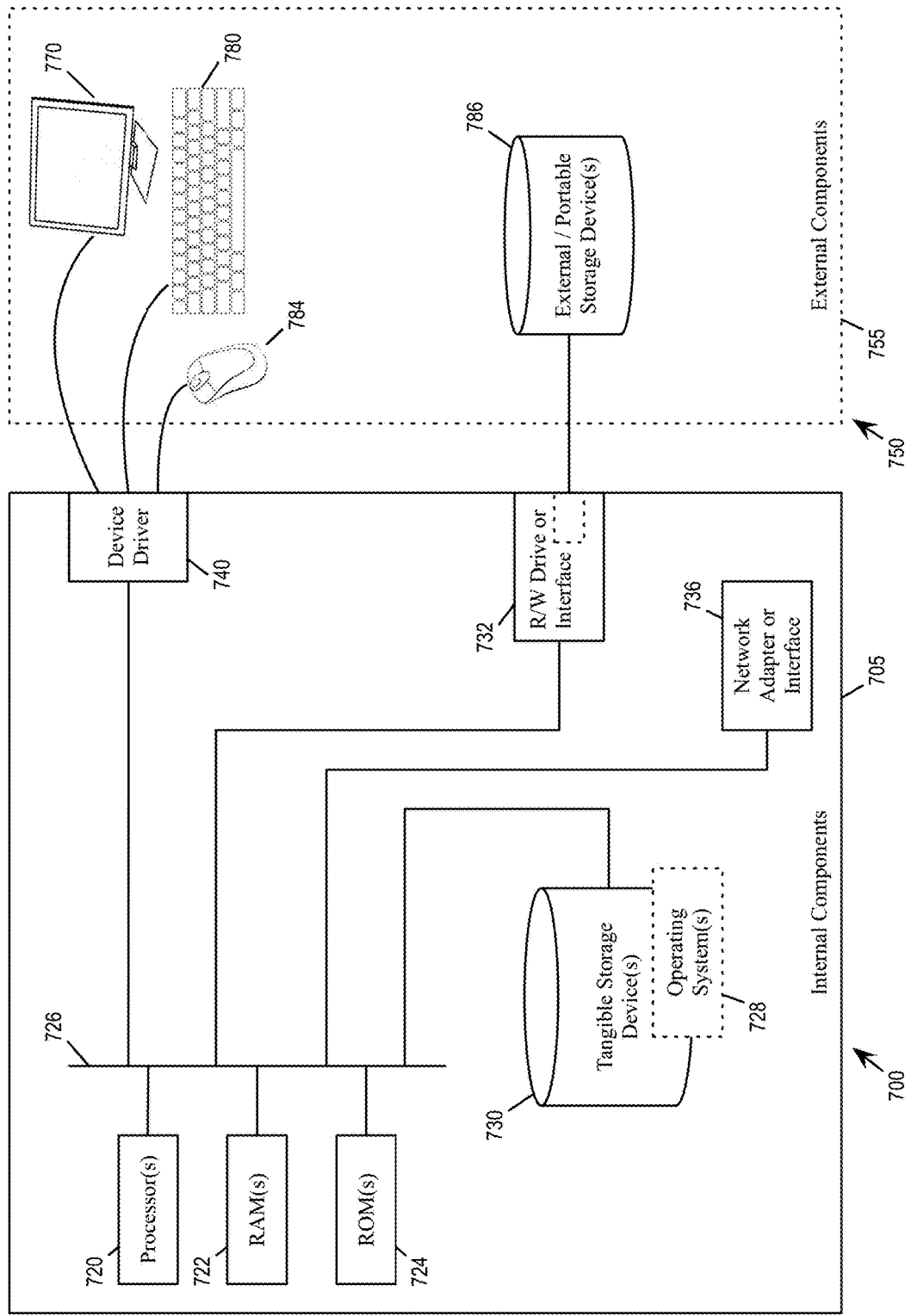
FIG. 7 shows a block diagram of the components of a data processing system in accordance with an illustrative embodiment of the present disclosure.

FIG. 7 shows a block diagram of the components of data processing systems 700 and 750 that may be used to implement the shift-left analysis system 100 in accordance with an illustrative embodiment of the present disclosure. It should be appreciated that FIG. 7 provides only an illustration of one implementation and does not imply any limitations with regard to the environments in which different embodiments may be implemented. Many modifications to the depicted environments may be made based on design and implementation requirements.

Data processing systems 700 and 750 are representative of any electronic device capable of executing machine-readable program instructions. Data processing systems 700 and 750 may be representative of a smart phone, a computer system, PDA, or other electronic devices. Examples of computing systems, environments, and/or configurations that may represented by data processing systems 700 and 750 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 700 and 750 may include a set of internal components 705 and a set of external components 755 illustrated in FIG. 7. The set of internal components 705 includes one or more processors 720, one or more computer-readable RAMs 722 and one or more computer-readable ROMs 724 on one or more buses 726, and one or more operating systems 728 and one or more computer-readable tangible storage devices 730. The one or more operating systems 728 and programs such as the programs for executing the processes 500 and 600 are stored on one or more computer-readable tangible storage devices 730 for execution by one or more processors 720 via one or more RAMs 722 (which typically include cache memory). In the embodiment illustrated in FIG. 7, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

The set of internal components 705 also includes a R/W drive or interface 732 to read from and write to one or more portable computer-readable tangible storage devices 786 such as a CD-ROM, DVD, memory stick, magnetic tape, magnetic disk, optical disk or semiconductor storage device. The instructions for executing the processes 500 and 600 can be stored on one or more of the respective portable computer-readable tangible storage devices 786, read via the respective R/W drive or interface 732 and loaded into the respective hard drive 730.

The set of internal components 705 may also include network adapters (or switch port cards) or interfaces 736 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 736. From the network adapters (or switch port adaptors) or interfaces 736, the instructions and data of the described programs or processes are loaded into the respective hard drive 730. The network may comprise copper wires, optical fibers, wireless transmission, routers, firewalls, switches, gateway computers and/or edge servers.

The set of external components 755 can include a computer display monitor 770, a keyboard 780, and a computer mouse 784. The set of external components 755 can also include touch screens, virtual keyboards, touch pads, pointing devices, and other human interface devices. The set of internal components 705 also includes device drivers 740 to interface to computer display monitor 770, keyboard 780 and computer mouse 784. The device drivers 740, R/W drive or interface 732 and network adapter or interface 736 comprise hardware and software (stored in storage device 730 and/or ROM 724).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

On-demand self-service: a cloud consumer can unilaterally provision computing capabilities, such as server time and network storage, as needed—automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud computing is an infrastructure that includes a network of interconnected nodes.

Figure 8:
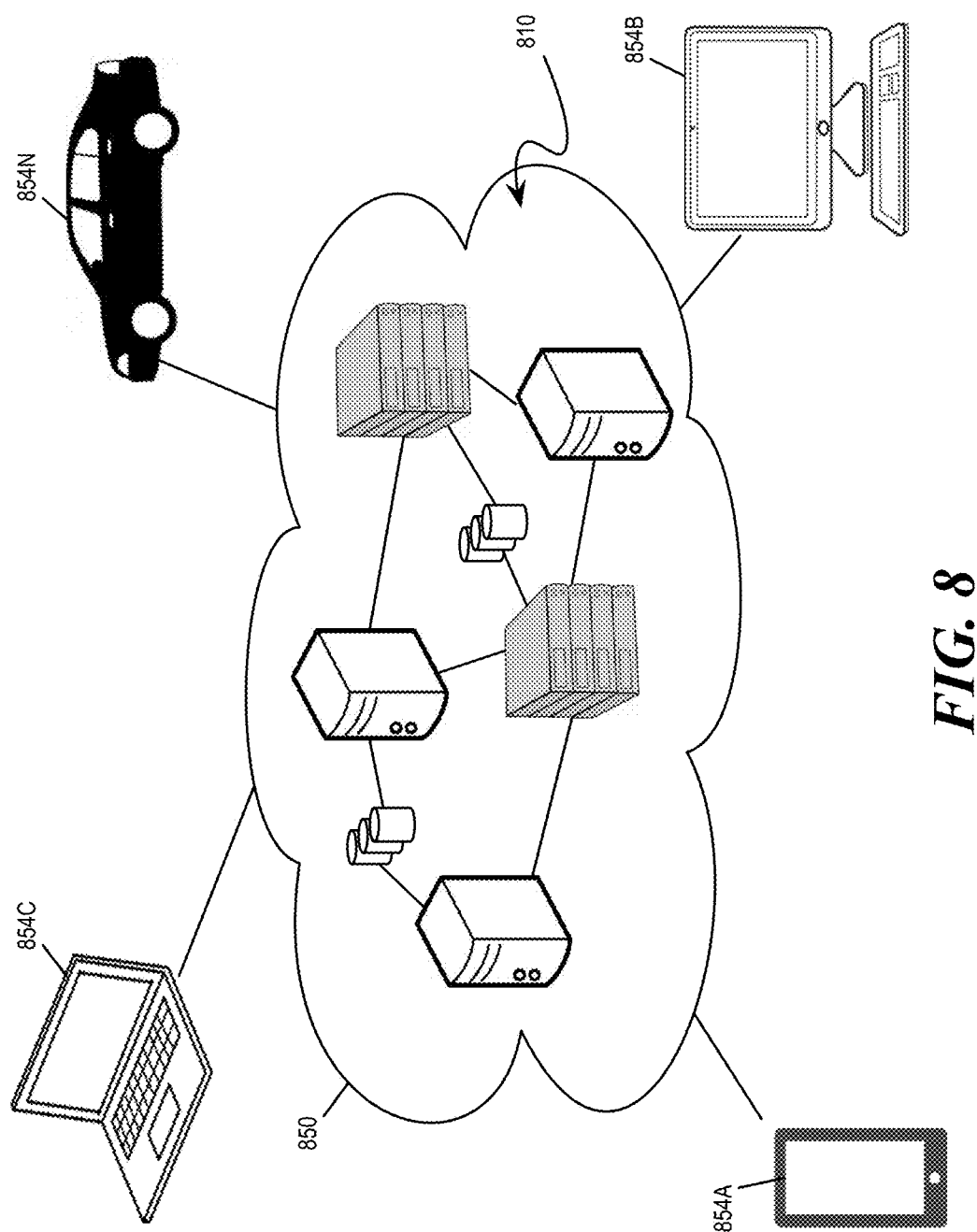
FIG. 8 illustrates an example cloud-computing environment.

Referring now to FIG. 8, an illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
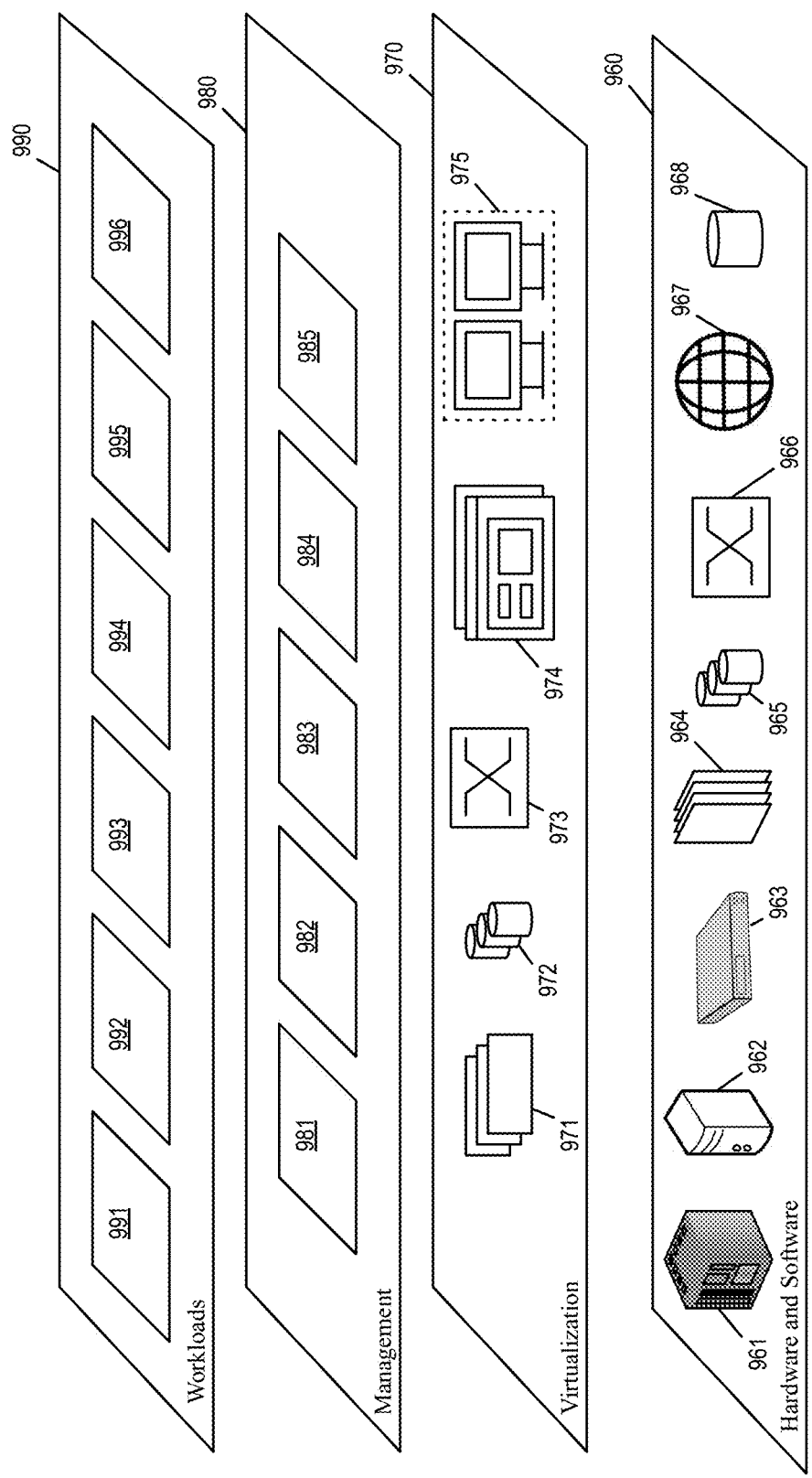
FIG. 9 illustrates a set of functional abstraction layers provided by a cloud-computing environment, consistent with an exemplary embodiment.

Referring now to FIG. 9, a set of functional abstraction layers provided by cloud computing environment 850 (of FIG. 8) is shown. It should be understood that the components, layers, and functions shown in FIG. 9 are intended to be illustrative only and embodiments of the disclosure are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud-computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and workload 996. In some embodiments, the workload 996 performs some of the operations of the shift-left analysis system 100. In some embodiments the workload 996 operate microservices for microservice-based applications.

The foregoing one or more embodiments implements a shift-left analysis system within a computer infrastructure by having one or more computing devices implementing the performance prediction model and generating performance estimate for an microservice-based application. The computer infrastructure is further used to generate input vectors to be applied to the performance prediction model based on the information regarding the application.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device comprising:
    a processor; and
    a storage device storing a set of instructions, wherein an execution of the set of instructions by the processor configures the computing device to perform acts comprising:
    receiving information regarding an application implemented by one or more microservices;
    for each microservice of the application, determining a microservice performance metric based on a performance prediction model for the microservice; and
    outputting an application performance metric for the application based on the microservice performance metrics determined for the one or more microservices of the application without a deployment of the application.

2. The computing device of claim 1, wherein the received information regarding the application comprises a source code, one or more configurations, one or more design documents, and one or more runtime measurements.

3. The computing device of claim 1, wherein the performance prediction model of a particular microservice is trained to produce a set of performance metrics when presented with a call path through the microservice.

4. The computing device of claim 3, wherein the call path is represented by a graph embedding vector having dimensions that correspond to a structure of the particular microservice.

5. The computing device of claim 4, wherein the call path corresponds to an invocation of an application program interface of the particular microservice.

6. The computing device of claim 1, wherein the performance prediction model of a particular microservice is trained by multiple training sets that correspond to different call paths through the particular microservice and runtime measurements.

7. The computing device of claim 1, wherein each microservice is a program configured to operate across multiple computing devices and is individually scalable to consume resources based on static configurations or dynamic conditions.

8. A computer program product comprising:
    one or more non-transitory computer-readable storage devices and program instructions stored on at least one of the one or more non-transitory storage devices, the program instructions executable by a processor, the program instructions comprising sets of instructions for:

receiving information regarding an application implemented by one or more microservices;

for each microservice of the application, determining a microservice performance metric based on a performance prediction model for the microservice; and outputting an application performance metric for the application based on the microservice performance metrics determined for the one or more microservices of the application without a deployment of the application.

9. The computer program product of claim 8, wherein the received information regarding the application comprises a source code, one or more configurations, one or more design documents, and runtime measurements.

10. The computer program product of claim 8, wherein the performance prediction model of a particular microservice is trained to produce a set of performance metrics when presented with a call path through the microservice.

11. The computer program product of claim 10, wherein the call path is represented by a graph embedding vector having dimensions that correspond to a structure of the particular microservice.

12. The computer program product of claim 8, wherein the performance prediction model of a particular microservice is trained by multiple training sets that correspond to different call paths through the particular microservice and runtime measurements.

13. The computer program product of claim 8, wherein each microservice is a program configured to operate across multiple computing devices and is individually scalable to consume resources based on static configurations or dynamic conditions.

14. A computer-implemented method comprising:

receiving information regarding an application implemented by one or more microservices;

for each microservice of the application, determining a microservice performance metric based on a performance prediction model for the microservice; and outputting an application performance metric for the application based on the microservice performance metrics determined for the one or more microservices of the application without a deployment of the application.

15. The computer-implemented method of claim 14, wherein the received information regarding the application comprises a source code, one or more configurations, one or more design documents, and one or more runtime measurements.

16. The computer-implemented method of claim 14, wherein the performance prediction model of a particular microservice is trained to produce a set of performance metrics when presented with a call path through the microservice.

17. The computer-implemented method of claim 16, wherein the call path is represented by a graph embedding vector having dimensions that correspond to a structure of the particular microservice.

18. The computer-implemented method of claim 17, wherein the call path corresponds to an invocation of an application program interface of the particular microservice.

19. The computer-implemented method of claim 14, wherein the performance prediction model of a particular microservice is trained by multiple training sets that correspond to different call paths through the particular microservice and runtime measurements.

20. The computer-implemented method of claim 14, wherein each microservice is a program configured to operate across multiple computing devices and is individually scalable to consume resources based on static configurations or dynamic conditions.

\* \* \* \* \*